Patented May 29, 1923.

1,457,225

UNITED STATES PATENT OFFICE.

GEORGE HUTCHINSON, OF ARCADIA, CALIFORNIA, ASSIGNOR OF ONE-HALF TO THOMAS H. WRIGHT, OF LOS ANGELES, CALIFORNIA.

METHOD OF MAKING MAGNESIUM.

No Drawing. Application filed June 1, 1922. Serial No. 565,214.

*To all whom it may concern:*

Be it known that I, GEORGE HUTCHINSON, a citizen of the United States, residing at Arcadia, in the county of Los Angeles and State of California, have invented new and useful Improvements in Methods of Making Magnesium, of which the following is a specification.

My invention relates to a process of making metallic magnesium from its compounds.

It is an object of this invention to produce metallic magnesium preferably starting with magnesium chloride converting the same into magnesium oxide, at least in part, and mixing the same with certain compounds which serve to lower the point of fusion of the compound and at the same time to generate nascent chlorine in the subsequent process of electrolysis. The molten mass is then subjected to electrolysis and the magnesium will rise to the surface of the molten mass and may be skimmed off.

My invention consists of the steps of the process hereinafter described and claimed.

I take the following materials by weight: magnesium chloride ten parts, sodium chloride one part, ammonium chloride one part, and sodium fluoride one-tenth part, and mix the same thoroughly. The mixture is then heated to about two hundred degrees C. with access of air. The ammonium chloride is volatilized and driven off. Chlorine is likewise driven off due to the decomposition of the magnesium chloride.

The ammonium chloride in some way assists in the fusion of the mass at this low temperature of two hundred degrees C. and the resulting mass consists partly of magnesium oxide.

The molten mass is then subjected to electrolysis in a suitable vessel. The anode is made of graphite and is placed preferably near the top of the molten mass, while the cathode is disposed near the bottom of the molten mass and consists of galvanized iron. I have obtained excellent results by using a current of 6 volts and 10 amperes in the process. The magnesium forms on the cathode and from time to time rises in the form of globules through the mass and floats on the top of the molten mixture whence it is skimmed off.

The advantage of this process of making metallic magnesium consists in the fact that the addition of sodium chloride and ammonium chloride to the mass lowers the point of fusion so that a current of low voltage and amperage may be used. Furthermore, the sodium chloride furnishes a nascent chlorine during the electrolysis. The sodium fluoride in some manner serves to coagulate the magnesium forming at the cathode so that the same will rise in spherical bodies to the top whence it may be skimmed off.

The resulting magnesium appears to be an alloy containing small quantities of sodium and aluminum. It is much harder than pure magnesium.

In the production of magnesium from magnesium carbonate by the electrical process, a current of 1200 volts is required, while in the present process starting with magnesium chloride, a current of 6 volts is sufficient to effect a disassociation.

I am not fully prepared to explain the reactions taking place in the electrolysis, but it appears that nascent chlorine is necessary and in some manner the ammonium chloride and sodium fluoride assist in the disassociation of the magnesium compound.

In place of magnesium chloride any other suitable magnesium compound may be used. The main object of this invention is to lower the fusing point of magnesium compounds by the addition of suitable reagents as explained above and to subject the molten mass to electrolysis in the presence of nascent chlorine. It will be understood by those skilled in the art that the proportions of the ingredients may be varied within wide limits; that in place of sodium chloride and sodium fluoride, the corresponding potassium or other metal compounds may be used without departing from the spirit of the invention as claimed.

What is claimed is:

1. In the process of producing magnesium from magnesium compounds the steps which comprise mixing magnesium chloride with a small percentage of a metal chloride, and fusing the mass under access of air.

2. In the process of producing magnesium from magnesium compounds the steps which comprise mixing magnesium chloride with a small quantity of sodium chloride, and fusing the mass under access of air.

3. In the process of producing magnesium from magnesium compounds the steps which comprise mixing magnesium chloride with a small quantity of sodium chloride and ammonium chloride, and fusing the mass.

4. In the process of producing magnesium from magnesium compounds the steps which comprise mixing magnesium chloride with a small quantity of sodium chloride, ammonium chloride and sodium fluoride, and fusing the mass.

5. The process of producing magnesium comprising mixing magnesium chloride with a small quantity of metal chloride, fusing the mass under access of air to convert the magnesium chloride, at least in part, to magnesium oxide, and subjecting the fused mass to electrolysis.

6. The process of producing magnesium from magnesium chloride comprising mixing the same with a small quantity of sodium chloride, ammonium chloride and sodium fluoride, fusing the mass under access of air, whereby the magnesium chloride is converted, at least in part, to magnesium oxide, and subjecting the same to electrolysis.

7. The process of producing magnesium from magnesium chloride comprising mixing the same with ten per cent of sodium chloride, ten per cent of ammonium chloride, and ten per cent of sodium fluoride, heating the same to a temperature of about two hundred degrees C. under access of air, whereby magnesium chloride is converted, at least in part, to magnesium oxide, and the mass is fused, and subjecting the fused mass to electrolysis.

In testimony whereof I have signed my name to this specification.

GEORGE HUTCHINSON.